(12) United States Patent
Bertken et al.

(10) Patent No.: US 9,817,411 B2
(45) Date of Patent: Nov. 14, 2017

(54) APPARATUS AND METHOD FOR OPTIMAL SELECTION OF CONSUMABLES IN A MATERIAL PROCESSING SYSTEM

(71) Applicant: Hypertherm, Inc., Hanover, NH (US)

(72) Inventors: Steven Bertken, Lees Summit, MO (US); E. Michael Shipulski, Etna, NH (US); Peter A. Officer, Hanover, NH (US)

(73) Assignee: Hypertherm, Inc., Hanover, NH (US)

( * ) Notice: Subject to any disclaimer, the term of this patent is extended or adjusted under 35 U.S.C. 154(b) by 205 days.

(21) Appl. No.: 14/634,215

(22) Filed: Feb. 27, 2015

(65) Prior Publication Data

US 2016/0252916 A1 Sep. 1, 2016

(51) Int. Cl.
| | |
|---|---|
| *B23K 10/00* | (2006.01) |
| *B23K 9/32* | (2006.01) |
| *G05D 23/19* | (2006.01) |
| *H05H 1/36* | (2006.01) |
| *G05B 15/02* | (2006.01) |
| *H05H 1/34* | (2006.01) |

(52) U.S. Cl.
CPC ....... *G05D 23/1917* (2013.01); *B23K 10/006* (2013.01); *G05B 15/02* (2013.01); *H05H 1/34* (2013.01); *H05H 1/36* (2013.01); *H05H 2001/3494* (2013.01)

(58) Field of Classification Search
CPC ......... B23K 10/00; B23K 9/32; B23K 10/006
USPC ........................................... 700/299
See application file for complete search history.

(56) References Cited

U.S. PATENT DOCUMENTS

2013/0206735 A1* 8/2013 Manthe ................. B23K 10/00
219/121.39

* cited by examiner

*Primary Examiner* — Michael J Brown
(74) *Attorney, Agent, or Firm* — Proskauer Rose LLP

(57) ABSTRACT

A material processing system for performing a processing operation includes a processor that receives information from a user relating to a proposed processing operation to be performed by the material processing system. The processor determines, responsive to the information received from the user, two or more configurations of consumable components for performing the proposed processing operation and estimates processing performance capabilities associated with using each configuration of consumable components. An interactive display presents the estimated processing performance capabilities to the user for selection.

24 Claims, 9 Drawing Sheets

| Configuration | Available Consumable | Cut Quality | | Cut Time | | Consumable Life | Total Cost |
|---|---|---|---|---|---|---|---|
| 1 | 130 amp | OK | | 2:51 min | $223 | 1 | $55.90 | $279 |
| 2 | 200 amp | Better | | 1:20 min | $111 | 1 | $59.25 | $171 |
| 3 | 400 amp | Best | | 57 min | $87 | 2 | $142.80 | $230 |

Material = MS, Thickness = 1", Cut Distance = 2983", Pierces = 143

FIG. 6

| Configuration | Amperage | Shield Cap | Shield | Nozzle Retaining Cap | Nozzle | Swirl ring | Electrode | SilverPlus Electrode | Water tube |
|---|---|---|---|---|---|---|---|---|---|
| 1 | 130 A | 220747 | 220183 | 220756 | 220182 | 220179 | 220181 | 220665 | 220340 |
| 2 | 200 A | 220637 | 220761 | 220757 | 220354 | 220353 | 220352 | 220666 | 220340 |
| 3 | 400 A | 220637 | 220636 | 220635 | 220632 | 220631 | 220629 | | 220571 |

FIG. 7

APPARATUS AND METHOD FOR OPTIMAL SELECTION OF CONSUMABLES IN A MATERIAL PROCESSING SYSTEM

TECHNICAL FIELD

The present invention relates generally to a method and corresponding apparatus for selecting consumables for use in material processing apparatus, such as plasma arc cutting torches.

BACKGROUND

Material processing apparatus, such as torch systems (e.g., plasma torch systems) and lasers, are widely used in the welding, cutting, and marking of materials commonly known as workpieces. A typical plasma torch system can include elements such an electrode and a nozzle having a central exit orifice mounted within a torch body, electrical connections, passages for cooling, passages for arc control fluids (e.g., plasma gas), and a power supply. A swirl ring is also often employed to control fluid flow patterns formed between the electrode and nozzle in the plasma chamber. In some torches, a shield can also be used to prevent molten spatter from damaging the torch components (e.g., the electrode, nozzle, or swirl ring).

A plasma torch typically operates by producing a plasma arc, a constricted ionized jet of a gas with high temperature and high momentum. Specifically, a pilot arc is first generated between the electrode (cathode) and the nozzle (anode). The pilot arc can be generated using a variety of techniques. For example, an arc can be generated between the electrode and the nozzle by means of any of a variety of contact starting methods. Contact start methods often involve establishing a physical contact and/or an electrical communication between the electrode and the nozzle and creating a current path between these two elements (i.e., the electrode and the nozzle).

Replaceable plasma arc torch components (commonly referred to as "consumables") are often exposed to high temperatures, and as such, can deteriorate over time from use. Typical torch consumables can include the electrode, swirl ring, nozzle, and shield. Although these consumable components can be easily replaceable in the field, replacing consumable components can lead to down time and reduced productivity.

SUMMARY

Design of torch consumables is often a highly technical task and can have a dramatic impact on torch life and performance. This is because the consumable components and the manner in which they are designed and combined affect the overall torch dimensions, configuration, weight, cost and other parameters. For example, as described in U.S. patent application Ser. No. 14/468,258, filed on Aug. 25, 2014, the entire teachings of which are incorporated herein by reference, certain variations in the number, shape, size, and angle of slots included on a plasma torch shield can reduce the amount of molten splatter buildup on the shield, increase the life expectancy of the shield, and improve the overall performance of the torch.

Consumable components of a material processing system (e.g., a plasma torch system) and the manner in which they are selected, designed, and combined affect the overall performance, dimensions, configuration, weight, cost, and other aspects of the material processing system. There are times when two or more consumable configurations can be used to perform a proposed processing operation, and the two configurations can have different performance results, e.g., processing quality or consumable life expectancy. Embodiments described herein generally relate to identifying material processing system design configurations that are suitable for performing a proposed processing operation based on preferred performance results.

In one aspect, a method for configuring a thermal processing system to perform a processing operation is featured. The featured method includes receiving, from a user, information relating to a proposed processing operation to be performed by the thermal processing system and, responsive to the information received from the user, determining two or more configurations of consumable components for performing the proposed processing operation. Thermal processing system performance capabilities associated with using each configuration of consumable components are estimated and the estimated processing performance capabilities for the two or more configurations of consumable components are presented, via an interactive device associated with the thermal processing system, to the user for selection.

In another aspect, a method for configuring a thermal processing system to perform a processing operation is featured. The featured method includes determining two or more sets of system parameters associated with performing the processing operation using two or more configurations of consumable components. The two or more sets of system parameters can correspond to different consumable resources suitable for performing the processing operation. For each configuration of consumable components, processing performance capabilities expected to be obtained from using the system parameters associated with the configuration of consumable components are estimated. The estimated processing performance capabilities are presented, via an interactive device associated with the thermal processing system, to a user for selection. Responsive to the user's selection, the processing operation is performed using a configuration of consumable components associated with the selected processing performance capabilities.

In yet another aspect, a thermal processing system for performing a processing operation is described. The thermal processing system includes a processor and an interactive display. The thermal processing system is configured to receive, from a user, information relating to a proposed processing operation to be performed by the thermal processing system, determine, responsive to the information received from the user, two or more configurations of consumable components for performing the proposed processing operation, and estimate processing performance capabilities associated with using each configuration of consumable components. The interactive display is configured to present the estimated processing performance capabilities to the user for selection.

In other examples, any of the aspects above, or any apparatus or method described herein, can include one or more of the following features.

The processing performance capabilities, for each configuration of consumable components, can be estimated using two or more sets of system parameters associated with performing the proposed processing operation using that configuration. The sets of system parameters can include at least one of ranges of speed, gas flow, or electrical current provided to the thermal processing system.

The estimated processing performance capabilities can include at least one of estimated quality of the proposed processing operation, estimated time needed to perform the proposed processing operation, estimated cost for performing the proposed processing operation, or estimated amount of time during which the configuration of consumable components can be used for performing the proposed processing operation.

The estimated cost for performing the proposed processing operation can include at least one of an estimated cost for amount of wear expected to be incurred by the configuration of consumable components or an estimated cost for amount of time expected to be consumed for performing the proposed processing operation using the configuration of consumable components.

The estimated processing performance capabilities can be presented to the user on a diagram. The diagram can provide the estimated processing performance capabilities associated with using each configuration of consumable components.

At least one of the configurations of consumable components corresponding to the estimated processing performance capabilities selected by the user can include at least one of an electrode, a nozzle, or a shield.

A visual representation of the estimated processing performance capabilities associated with using each configuration of consumable components can be presented to the user. Responsive to the selection of the user, the proposed processing operation can be performed using a configuration of consumable components associated with the selected processing performance capabilities.

The estimated processing performance capabilities associated with using at least three configurations of consumable components can be presented to the user.

The processing operation can be a cutting operation. The resources expected to be consumed for performing the processing operation include at least one of gas flow or electrical current provided to the thermal processing system.

The thermal processing system can be configured to estimate the processing performance capabilities, for each configuration of consumable components, using two or more sets of system parameters associated with performing the proposed processing operation using that configuration. The sets of system parameters can include at least one of ranges of speed, gas flow, or electrical current provided to the thermal processing system.

The thermal processing can perform the proposed processing operation, responsive to the user's selection, using a configuration of consumable components associated with the selected processing performance capabilities.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 6 is an example of a diagram that can be used to present the estimated processing performance capabilities of a material processing system to a user for selection.

FIG. 7 is an example of the information that can be presented to the user regarding a proposed configuration of consumables.

DETAILED DESCRIPTION

Figure 1:
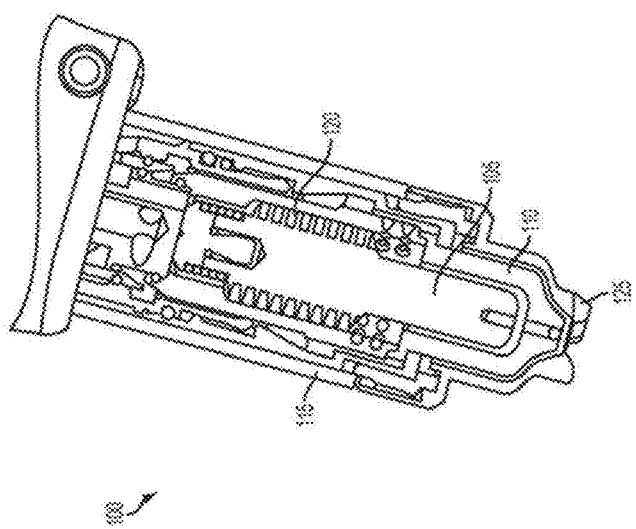
FIG. 1 is a cross-sectional view of a plasma arc torch tip.

FIG. 1 shows a cross-sectional view of a portion of a plasma arc torch 100. The plasma torch 100 is comprised of a variety of different consumables, for example, an electrode 105, a nozzle 110, a retaining cap 115, a swirl ring 120, or a shield 125. The nozzle 110 has a central exit orifice mounted within a torch body. The torch 100 can include electrical connections, passages for cooling, and passages for arc control fluids (e.g., plasma gas). The shield 125 is used to prevent molten spatter from damaging the other components of the torch, for example, the electrode 105, nozzle 110, retaining cap 115, or swirl ring 120. Often, the molten spatter builds up on the shield 125 causing double arcing or melting of the shield 125. The build-up typically increases as the cutting time increases.

Consumable components of a torch 100 and the manner in which they are selected, designed, and combined can affect the overall performance, dimensions, configuration, weight, cost, and other aspects of the material processing system. Design of these consumables is highly technical and has a dramatic impact on torch life and performance. For example, as described in U.S. application Ser. No. 14/468,258, filed on Aug. 25, 2014, the entire teachings of which is incorporated herein by reference, altering the shield castellation mass and shape can affect the heat transfer properties of the shield, which in turn, can alter the overall performance, dimensions, and other aspects of the material processing system. Similarly, alterations in the design, combination, and configurations of other shield consumables (e.g., electrode, swirl ring, and nozzle) can affect the overall torch dimensions, configuration, weight, cost and etc.

Figure 2:
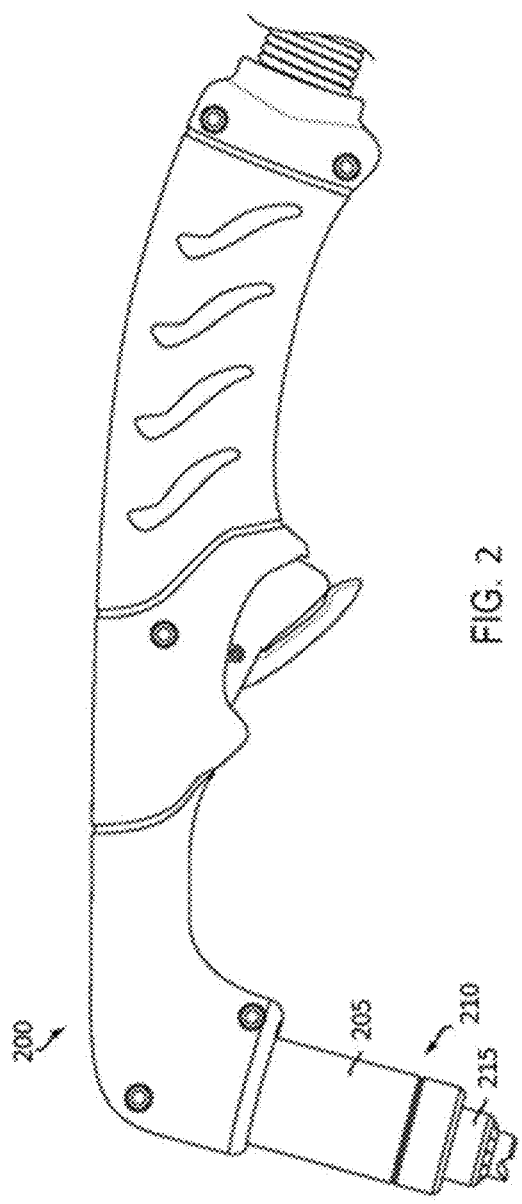
FIG. 2 is a schematic illustration of a plasma arc torch system that can be used with the embodiments described herein.

FIG. 2 is a schematic illustration of a plasma arc torch system 200 that can be used with the embodiments described herein. The torch system includes a torch body 205 that defines a plasma gas flow path for directing a plasma gas to a plasma chamber in which a plasma arc is formed. An electrode (not shown) is disposed within the torch body 205. The electrode can be, for example, the electrode 105 shown in FIG. 1. A nozzle (not shown) is disposed relative to the electrode at a distal end 210 of the torch body 205. The nozzle can be, for example, nozzle 110 shown FIG. 1. The torch system 200 also includes a shield 215 disposed relative to an exterior surface of the nozzle at the distal end 210 of the torch body 205.

Figure 3:
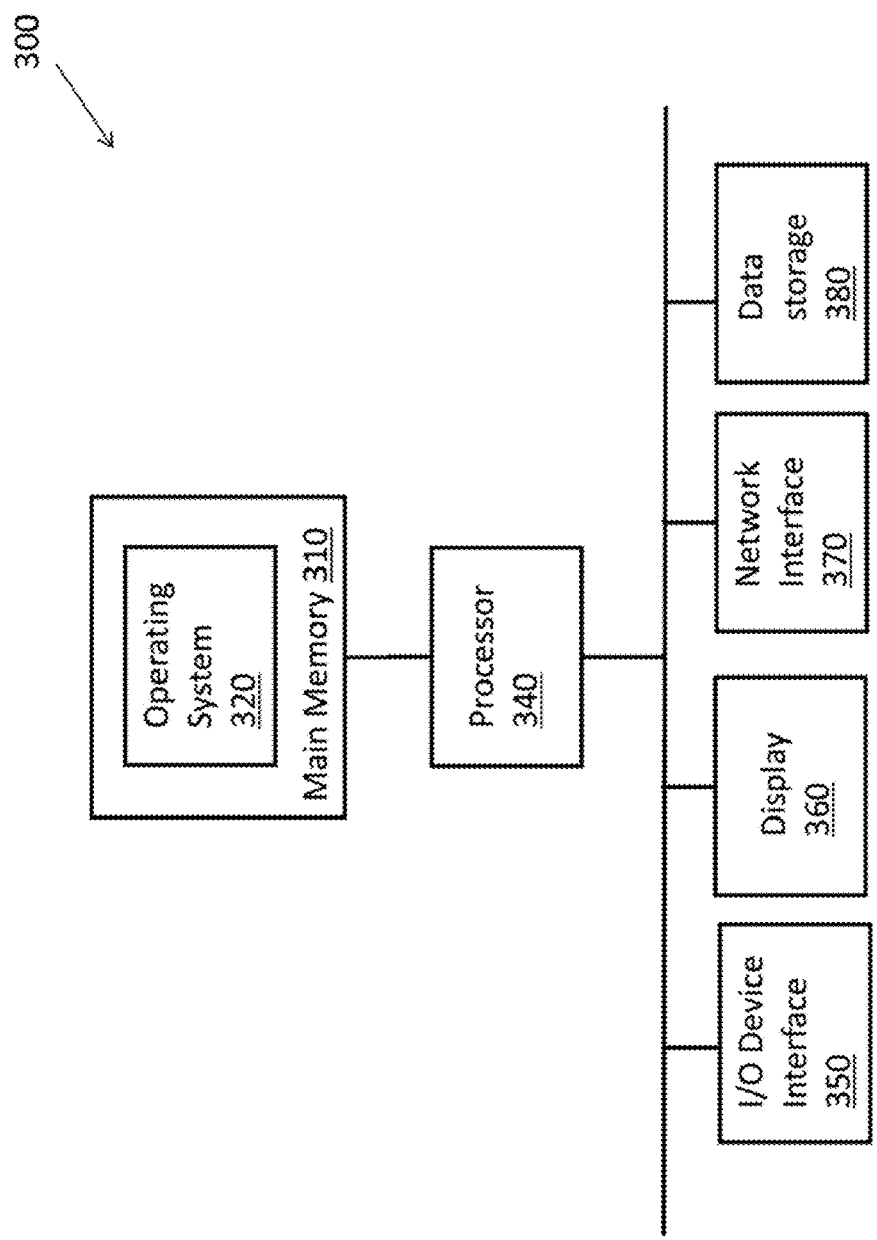
FIG. 3 is an example of computer hardware or digital electronic circuitry that can be used with the embodiments disclosed herein.

FIG. 3 is an example of computer hardware or digital electronic circuitry 300 that can be used with the embodiments disclosed herein. Without limitation, the techniques described herein can be implemented in digital electronic circuitry or in computer hardware that executes firmware, software, or combinations thereof. The implementation can be as a computer program product (e.g., a computer program tangibly embodied in a machine-readable storage device) for execution by, or to control the operation of, data processing apparatus (e.g., a programmable processor, a computer, or multiple computers).

Computer programs used with the embodiments disclosed herein can be written in any form of programming language, including compiled or interpreted languages. These computer programs can be deployed in any form, including as a stand-alone program or as a module, component, subroutine, or other unit suitable for use in a computing environment. The computer programs can further be arranged to be executed on one computer or more computers at one site or distributed across multiple sites and interconnected by a communications network.

The digital electronic circuitry 300 can include a main memory unit 310. The main memory 310 can be a read-only memory or a random access memory or both. The main memory can hold various computer executable instructions and data structures including computer executable instructions and data structures that implement aspects of the embodiments described herein. The main memory 310 can also include an operating system 320 and be arranged to implement various conventional operating system functions including task and process scheduling, memory management, and controlled access to various devices, such as data storage 380. The processes may include computer-executable instructions and data that are configured to implement various aspects of the techniques described herein.

Machine-readable storage devices suitable for embodying computer program instructions and data include all forms of non-volatile memory, including for example semiconductor memory devices (e.g., EPROM, EEPROM, and flash memory devices), magnetic disks (e.g., internal hard disks or removable disks; magneto-optical disks), and CD-ROM and DVD-ROM disks.

The main memory unit 310 of the digital electronic circuitry 300 can be coupled to a programmable processor 340. In some embodiments, more than one programmable processor may be deployed. Generally, the processor 340 is arranged to receive instructions and data from the main memory 310 and execute the instructions, including those that perform functions of the embodiments described herein, or method steps described herein, by operating on input data and generating output. Method steps described herein can also be performed by, and apparatus can be implemented using circuits known in the art, for example as a special purpose logic circuitry (e.g., field programmable gate array (FPGA)) or an application specific integrated circuit (ASIC). Modules described in connection with the embodiments disclosed herein can refer to portions of the computer program and/or the processor/special circuitry that implements that functionality.

The processor and the memory can be supplemented by, or incorporated in special purpose logic circuitry. The processor 340 can be coupled with a cache unit (not shown), which is responsible for storing copies of the data from the most frequently used main memory 310 locations.

The processor 340 can be connected to various interfaces via an input/output (I/O) device interface 350. The input/output interface 350 can include logic to interface with various input/output devices (not shown), such as torch 200 (shown in FIG. 4), and allow signals to be transferred between the processor 340 and the various input/output devices. Additional interface devices, such as display 360, may be used to receive input from a user (not shown) and/or transfer signals to/from the main memory 310 and the processor 340.

The display 360 is arranged to receive information from a user (not shown) and display information received from the main memory 310, processor 340, and/or other components of the system described herein. The display 360 can be a touch screen interactive display that can detect a user's commands or gestures and translate these commands into instructions that can be used by the processor 340. In some implementations, the display can provide the user with a Graphical User Interface (GUI). The user can employ the GUI to interface with the system described herein. Alternatively or additionally, the user can interface with the system using a peripheral device (e.g., a computer mouse or a computer keyboard).

The digital electronic circuitry 300 can also include a network interface 370 that connects the digital circuitry to a network. The network interface 370 can include a wireless interface that allows the digital circuitry 300 to wirelessly connect to remote devices (not shown).

Figure 4:
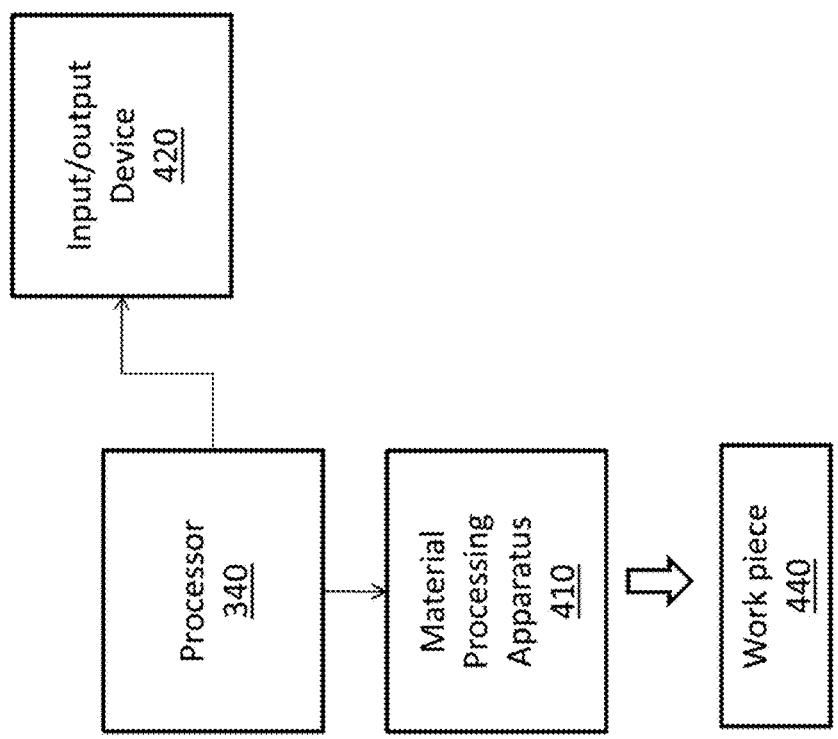
FIG. 4 is a block diagram of a material processing system according to an illustrative embodiment disclosed herein.

FIG. 4 is a block diagram 400 of a material processing system according to an illustrative embodiment disclosed herein. The material processing system includes a material processing apparatus 430 coupled with a processor 340. The material processing apparatus 420 can be any material processing system known in the art. In some embodiments, the material processing apparatus 420 can be Material a torch system (e.g., plasma torch systems, such as the torch system 200 shown in FIG. 2).

The processor 340 can be any programmable processor known in the art. As described in connection with FIG. 3, the processor 340 can be connected to an input/output device 420 through an input/output interface 350 (FIG. 3, not shown in FIG. 4) and arranged to transfer and receive signals to/from the input/output device 420. The input/output device 420 can be an interactive display or any other input/output device known in the art that can receive and transfer commands between a user (not shown) and the processor 340.

The processor 340 is further coupled with the material processing apparatus 410 and arranged such that it can send and receive commands and information to/from the material processing apparatus 410. The processor 340 can connect to the input/output device 420 and/or the material processing apparatus 410 using any method known in the art. For example, the processor 340 and the material processing apparatus 410 can be connected directly (e.g., using cables and/or wires). Alternatively or additionally, the processor 340 and the material processing apparatus 410 can be connected through a wireless connection. For example, each of the material processing apparatus 410 and/or processor 340 can be coupled with a respective remote interface that allows these components to be accessed remotely. For example, each of the material processing apparatus 410 and/or processor 340 can be arranged such that they can be accessed using a personal computer, connected to a local area network. Alternatively or additionally, each of the material processing apparatus 410 and/or processor 340 can be arranged such that they include a modem capable of interfacing with a remote user/remote device. The material processing apparatus 410 and/or processor 340 can be arranged to connect to a telephone network and/or such that they include a wireless network that allows these components to be accessed wirelessly by remote devices and/or users.

The input/output device 420 can receive an input from a user (not shown) wishing to conduct a material processing operation. The input can include information relating to a proposed processing operation to be performed by the processing apparatus 410. For example, the input/output device 420 can be an interactive display that allows a user to provide information regarding a cutting procedure that they wish to complete using a plasma arc torch. The user can provide the processor with various information regarding a desired proposed processing operation. For example, the user can provide the system with information regarding the type of workpiece 440 involved in the cutting process (e.g., the material(s) used in the workpiece, the shape, and/or the thickness of the workpiece), the desired speed (or desired cut time) of the cutting process, the desired quality of the cutting process, the desired cost for performing the process, the desired time for completing the process, the desired time that the consumable components of the processing apparatus 410 (e.g., plasma torch) can be used for performing the proposed processing operation, etc.

In response to the information received from the user, the processor 340 determines two or more configurations of consumable components for performing the proposed processing operation. Accordingly, the two or more configurations of consumable components uniquely address the specific needs of proposed processing operation because they are determined based on the information (e.g., workpiece features, desired speed or cost, etc.) provided by the user regarding his/her proposed processing operation. The configurations of the consumable components can include variations in size, shape, material, design characteristics, etc. of the consumables that can be used to complete the proposed processing operation. For example, in a proposed cutting operation, the configurations can include various configurations of consumable elements such as swirl rings, electrodes, nozzles, shields, etc.

The processor 340 estimates the processing performance capabilities associated with using each configuration of consumable components. The processor 340 can estimate the performance capabilities for each configuration of consumable components using two or more sets of system parameters associated with performing the proposed processing operation using that configuration. For example, for each consumable configuration, the processor 340 can estimate processing performance capabilities such as the estimated quality of the proposed processing operation, the estimated time needed to perform the proposed processing operation, the estimated cost for performing the proposed processing operation, or the estimated amount of time during which the configuration of consumable components can be used for performing the proposed processing operation. In order to estimate these performance capabilities, the processor 340 can use system parameters such as ranges of speed, gas flow, or electrical current provided to the thermal processing system.

For example, in a cutting application, the processor 340 can consider factors such ranges of speed, gas flow, or electrical current provided to a plasma arc torch to determine the estimated processing performance capabilities associated with using each configuration of consumable components. The performance capabilities can include factors such as the quality and characteristics of a cutting operation (e.g., if the user wishes to have one or more of a hole taper, dross, edge bevel cut and other factors such as the roughness, corner features, and dimensions of the cut), cutting time, cutting speed, cutting cost, and overall life time of consumables.

The processor 340 can estimate the cost for performing the proposed processing operation includes at least one of an estimated cost for amount of wear expected to be incurred by the configuration of consumable components or an estimated cost for amount of time expected to be consumed for performing the proposed processing operation using the configuration of consumable components.

For example, in a cutting operation, the processor 340 can consider factors such as the cost of each consumable, the cost of amount of time expected for replacing a consumable element after it can no longer be used, and the overall cost of using the consumable in a cutting operation.

The processor 340 presents the estimated performance capabilities associated with using each configuration of consumable components to the user for selection. The information regarding the estimated performance capabilities can be presented to the user using any available suitable input/output device 420, for example using an interactive device (e.g., an interactive display). For example, in a cutting operation, the display can provide the user with estimated performance capabilities associated with using various configurations of plasma torch consumables.

The estimated performance capabilities can be presented to the user on a diagram that provides the estimated processing performance capabilities associated with using each configuration of consumable components. Alternatively or additionally, visual representations of each configuration of the consumables and/or their corresponding performance capabilities can be presented to the user for selection.

In response to receiving a selection of consumables from the user, the processor 340 can signal the material processing apparatus 410 to perform the proposed material processing operation using the configuration selected by the user. For example, in a cutting operation, upon receiving a selection from the user regarding the consumable configuration that the user wishes to use to conduct the cutting operation, the processor 340 can instruct the plasma arc torch to use that configuration of the consumables to complete the cutting process.

Figure 5:
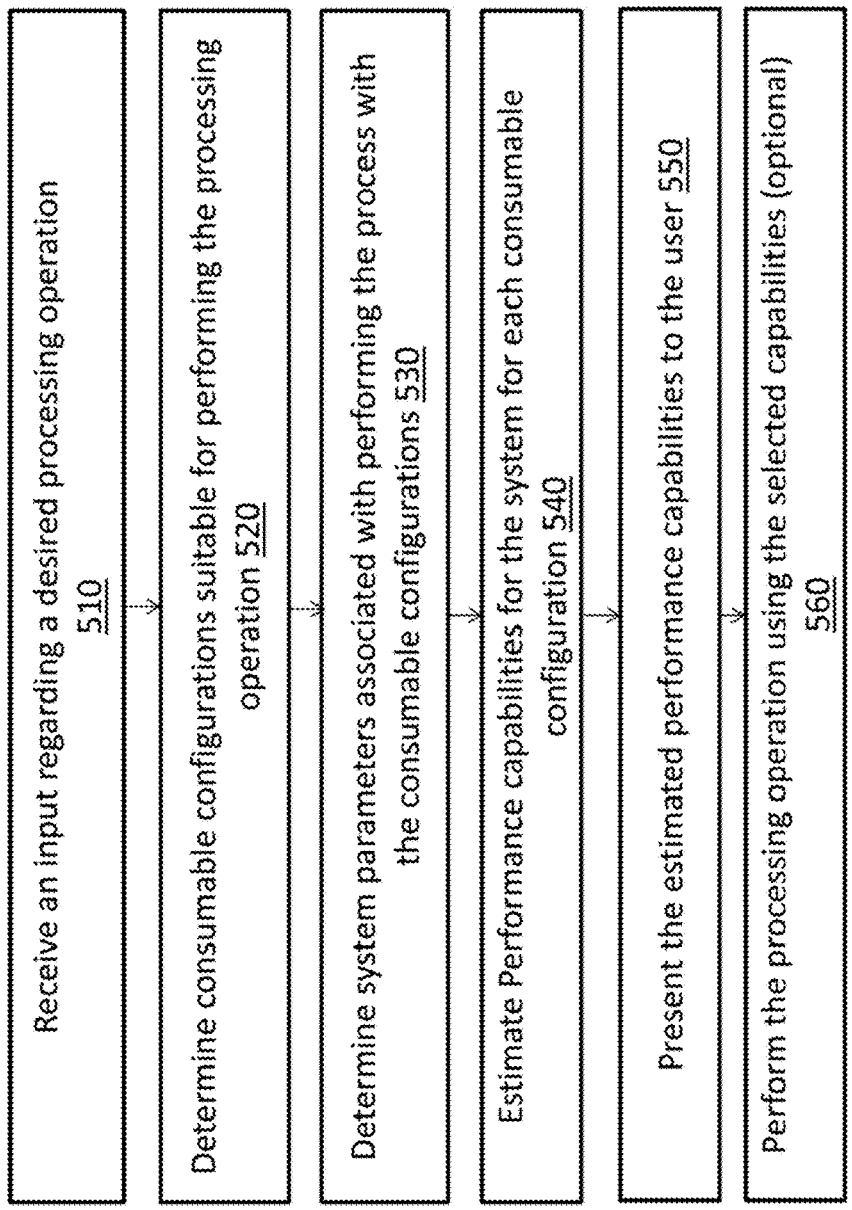
FIG. 5 is a flow diagram of procedures for configuring a material processing system to perform a material processing operation, according to an embodiment disclosed herein.

FIG. 5 is a flow diagram 500 of procedures for configuring a material processing system to perform a material processing operation, according to an example embodiment disclosed herein. The thermal processing system includes a processor (e.g., processor 340, shown in FIG. 4) that receives an input (e.g., from a user) regarding a desired processing system 510. In response to the input, the processor determines a number of different consumable resources (consumable configurations) suitable for performing the processing operation 520. The processor also determines a number of system parameters associated with performing the processing operation using the configurations of consumable components 530.

For each configuration of consumable components, the processor coupled with the thermal processing system estimates processing performance capabilities expected to be obtained from using the system parameters associated with the configuration of consumable component 540. These performance capabilities are presented to the user (e.g., via an interactive device associated with the thermal processing system) for selection 550. The thermal processing system can optionally perform the processing operation using the selected capabilities 560.

FIG. 6 is an example of a diagram that can be used to present the estimated processing performance capabilities of a material processing system to a user for selection, e.g., using display 360. Although, shown as a graphical representation, the estimated processing performance capabilities can be displayed via a variety of other techniques, such as charts, images, etc.

In the example shown in FIG. 6, the user indicates to the material processing system that he/she wishes to use the processing system to make a 1 inch thick cut in a certain material such as mild steel ("MS") workpiece, the desired cutting distance is 2983 inches and the user desires to make 143 pierces in this workpiece. In this example, in response to the user's input, the material processing system determines three configurations of consumables that can be used in making a cut with the desired characteristics indicated by the user.

To aid the user in selecting from among the proposed configurations, the material processing system can present the user with some information regarding the consumables that are being suggested for incorporation in each configuration. For example, the material processing system can display a graphical representation (e.g., photo, lab drawings, graphical rendering, etc.) of the proposed consumable; the common name of the recommended consumable, and/or provide the user with part numbers of the consumables that are being suggested for use in each configuration.

FIG. 7 includes an example of the information that can be presented to the user regarding the consumables that are proposed for incorporation ("recommended consumables") in each of the configurations shown in FIG. 6. In the example shown in FIG. 7, for each proposed configuration, part numbers assigned by the manufacturer are used to identify the recommended consumables. Although the example shown in FIG. 7 is limited to information regarding the proposed shield cap, shield nozzle, retaining cap, nozzle, swirl ring, electrode, and water tube that are used in each configuration, any other relevant information regarding the proposed configurations can be presented to the user. It should be noted that the recommended part numbers provided in the example shown in FIG. 7 are derived from actual part numbers assigned to consumables manufactured by Hypertherm Inc.

The material processing system can be interactive. Specifically, the material processing system can be arranged to provide the user with the option of changing one or more of the recommended consumables and/or electing specifically desired consumables. For example, if a user is interested a carrying out a requested cutting operation using one or more specific consumables (e.g., Hypertherm® Shield Cap 220747 or Hypertherm® Electrode 220352), the user can change the recommended consumables in each configurations, elect his/her desired consumables, and request a reevaluation of system parameters such as cost quality, consumable life, cut time, and total cost from the material processing system. The material processing system can be arranged such that it responds to the user's selection of one or more desired consumables by reevaluating the system parameters. The material processing system can further provide the user with a number of new configurations (e.g., three new configurations) that incorporate the user's desired consumable(s).

The material processing system can provide the user with the option of electing his/her desired consumables before presenting the user with recommended configurations. For example, referring to FIG. 5, the material processing system can receive the user's selection of one or more desired consumables as an input 510 that is taken into consideration in determining other consumables that are suitable for performing the processing operation 520. Further, as noted above, the material processing system can provide the user with the option of electing the amount of time that the user wishes to spend on cutting a given workpiece and, in response, provide the user with a proposal for the consumable configurations that can provide that desired cut time. In addition or in place of receiving the user's desired cut time/speed as input, the material processing system can receive, from the user, one or more of the user's desired cut quality, desired consumable life, or desired total cost, and, in response, provide the user with a proposal for suitable consumable configurations.

Referring back to FIG. 6, in the first configuration, the consumable being used is a consumable requiring an operating current of 130 Amperes (Amps). This consumable is expected to generate a reasonable cut quality (an "OK" cut quality) an image of which (Q1) is presented to the user for review. The expected cut time is about 171 minutes and the cost for the cut time is approximated to be about $223. This configuration of consumables would not require the user to replace the consumable during the cut process (number 1 indicates that one set of consumables would be sufficient to complete this cutting process) and the consumables cost associated with using these consumables for this cut is approximately $55.90. Overall, a total cost of $279.00 is expected for this configuration of the consumables, which includes the consumable cost and a cost associate with the amount of time the equipment is in use.

In the second configuration, the consumable being used is a consumable using an operating current of 200 Amps. This consumable is expected to generate a better cut quality than the first configuration (a "better" cut quality) an image of which (Q2) is presented to the user for review. The expected cut time is about 80 minutes and the cost for the cut time is approximated to be about $111. This configuration of consumables would not require the user to replace the consumable during the cut process (number 1 is used to indicate that one set of consumables would be sufficient to complete this cutting process) and the cost associated with using the consumables is approximately $59.25. Overall, a total cost of $171.00 is expected for this configuration of the consumables.

In the third configuration, the consumable being used is a consumable requiring an operating current of 400 Amps. This consumable is expected to generate the best cut quality compared to the previous configurations (the "best" cut quality) an image of which (Q3) is presented to the user for review. The expected cut time is about 57 minutes and the cost for the cut time is approximated to be about $87. This configuration of consumables would require the user to replace the consumable during the cut process (number 2 is used to indicate that two sets of consumables would be required to complete this cutting process) and the cost associated with using the consumables is approximately $142.80. Overall, a total cost of $230.00 is expected for this configuration of the consumables.

The user can use this information to balance his/her desired processing characteristics (e.g., cut quality) against other considerations (e.g., cut time, cut cost, consumable life, and total cost) and select a configuration of consumable to complete his/her desired processing operation.

A comparison of these three choices helps to inform the operator that in some cases the operating time of the operator and equipment is the key cost (the 130 amp example), while in others the consumable cost predominates (the 400 amp example). Informed choices can thus be made to maximize shop efficiency.

Further, in order to facilitate the user's selection of a proposed configuration, the material processing system can display a graphical representation of the processing performance capabilities associated with using each proposed configuration of consumable components. For example, the material processing system can display a graph or a chart of the performance capabilities that it expects the user to obtain from each suggested configuration.

Figure 8A:
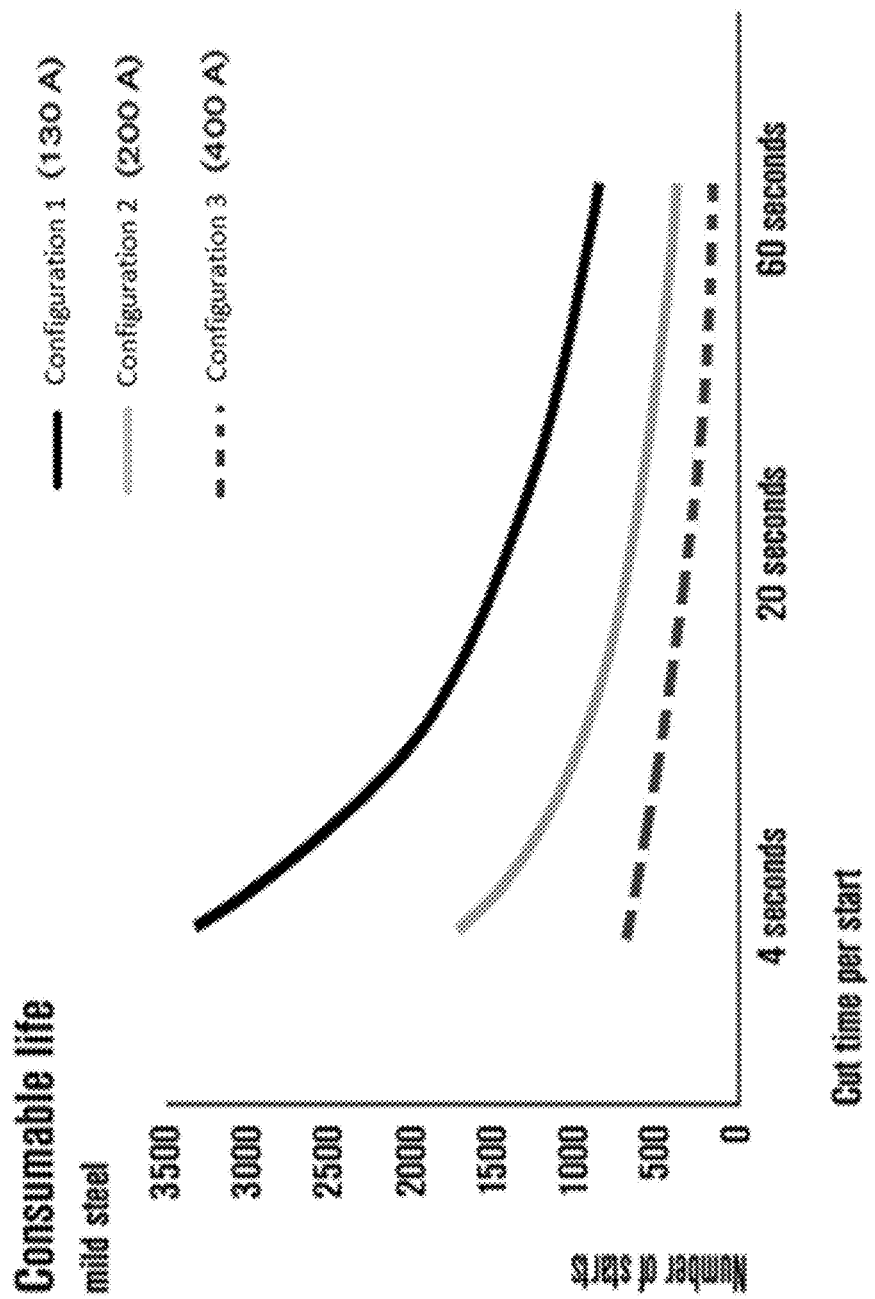
FIG. 8a is an example of a diagram that can be used to display the processing performance capabilities associated with using a proposed configuration of consumable components to a user.

FIG. 8a is an example of such a diagram that can be used to display the processing performance capabilities associated with using the proposed configurations shown in FIG. 6. Specifically, the diagram presented in FIG. 8a displays the estimated consumable life that the processing system expects the user to obtain from each configuration. In the example shown in FIG. 8a, the values shown on the vertical axis represent the number of arc starts that can be achieved from the electrode proposed for use in each configuration. The values on the horizontal axis represent the duration of the proposed material processing operation (e.g., cut duration). In other words, the graphs shown in FIG. 8a represent the number of cuts that the material processing system expects to be achieved, from a recommended electrode, while making a cut having a duration ranging from 4 seconds to 60 seconds.

In the first configuration (130 Amp configuration), when performing cuts having 4 second durations the expected number of achieved arc starts is approximately 600 within the cutting quality parameters identified in FIG. 8A. This value is shown to drop to about 100 arc starts when operating with 60 second cuts. Similarly, using the second configuration (200 Amp configuration), when performing cuts having a 4 second duration the expected number of achieved arc starts is approximately 1700 within the cutting quality parameters identified in FIG. 8A. This value is shown to drop to about 500 arc starts when operating with 60 second cuts. In the third configuration (400 Amp configuration), when performing cuts having a 4 second duration the expected number of achieved arc starts is approximately 3200 within the cutting quality parameters identified in FIG. 8A. This value is shown to drop to about 1700 arc starts when operating with 60 second cuts.

For each requested material processing operation, the users of the material processing system can employ graphs such as that shown in FIG. 8a to assess expected processing characteristics (e.g., consumable life) associated with each proposed configuration for operating the material processing system. This facilitates the user's selection of a configuration that best suits the requirements of his/her proposed material processing operation.

Figure 8B:
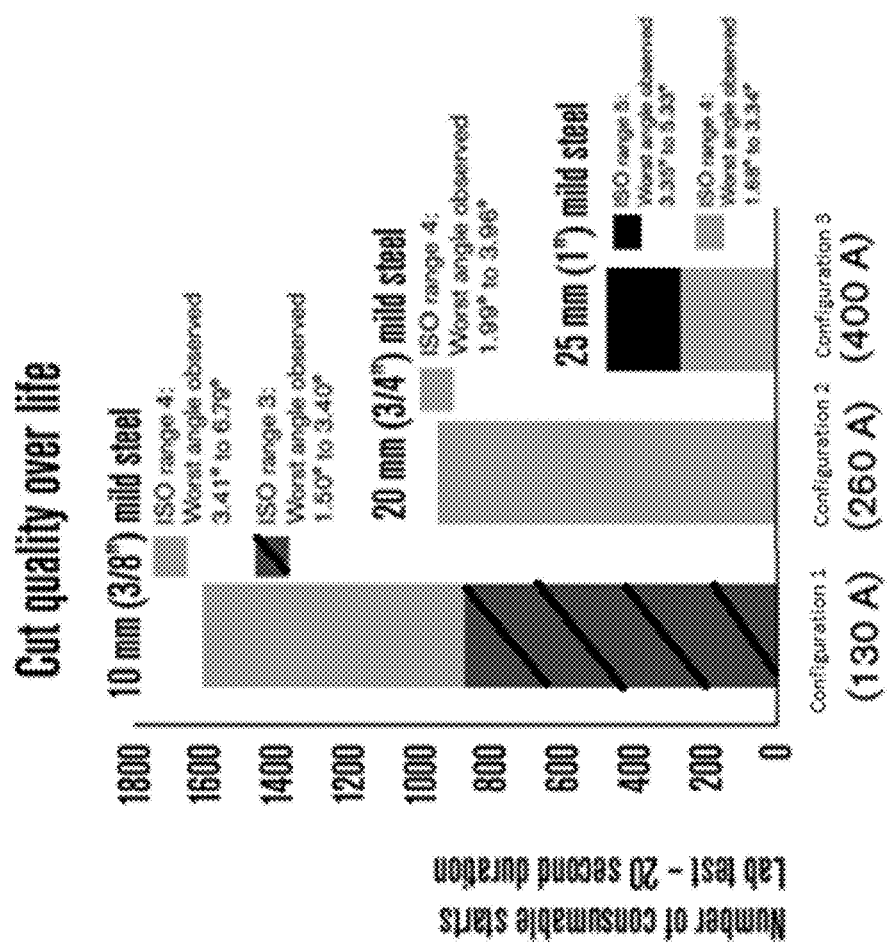
FIG. 8b is an example of a chart that can be used to display the processing performance capabilities associated with using a proposed configuration of consumable components to a user.

FIG. 8b is an example of a chart that can be used to display the processing performance capabilities associated with using the proposed configurations shown in FIG. 6. More specifically, FIG. 8b illustrates how the cut quality obtained from a torch can deteriorate over the life span of an electrode. Here, the life of an electrode is illustrated in terms of the number of arc starts that can be using cuts of 20 seconds duration during laboratory testing (i.e., multiple 20-second long cutting operations).

For the first proposed configuration test cuts are performed on a 10 millimeter (mm) (i.e., ⅜ inch) mild steel workpiece. The chart shown in FIG. 8b illustrates that the worst cut angle expected to be obtained from the first (approximately) 900 arc starts is about 1.5° to 3.4°. This categorization places the worst cut quality obtained from the first 900 cuts of the first configuration (Configuration I) within range 3 of International Organization for Standardization ("ISO") procedure. After the first 900 arc starts are achieved, the worst cut quality obtained from the remaining 700 arc starts achieved from the first configuration is expected to be within ISO range 4 (i.e., the worst angle observed is expected to be between 3.41° to 6.79°).

For the second proposed configuration test cuts are performed on a 20 millimeter (mm) (i.e., ¾ inch) mild steel workpiece. The chart shown in FIG. 8b illustrates that the worst cut angle expected to be obtained from the first (approximately) 950 arc starts is expected to be within ISO range 4 (i.e., the worst angle observed is expected to be between 3.41° to 6.79°).

For the third proposed configuration test cuts are performed on a 25 millimeter (mm) (i.e., 1 inch) mild steel workpiece. The chart shown in FIG. 8b illustrates that the worst cut angle expected to be obtained from the first 950 arc starts is expected to be within ISO range 4 (i.e., the worst angle observed is expected to be between 3.41° to 6.79°).

As noted above, by displaying charts such as that shown in FIG. 8b, the material processing system can facilitate the user's selection of a configuration that best fits the requirements of a proposed material processing operation, and the informed user can use the invention to optimize cut quality results, or number of starts (consumable life), or to reduce the cost of consumables required to perform particular operations. In some embodiments, the selected consumable set can process a workpiece in several different ways (e.g., different cutting currents and cut speeds (or cut times)) with the same set of consumables, resulting in different overall consumable costs and quality. These different costs are based on the operating life expectancy of the consumables for the operating conditions selected.

Although various aspects of the disclosed method have been shown and described, modifications may occur to those skilled in the art upon reading the specification. The present application includes such modifications and is limited only by the scope of the claims.

What is claimed is:

1. A method for configuring a thermal processing system to perform a processing operation, the method comprising:
   receiving, from a user, information relating to a proposed processing operation to be performed by the thermal processing system;
   responsive to the information received from the user, determining two or more consumable component configurations for performing the proposed processing operation;
   estimating processing performance capabilities associated with using each of the consumable component configuration, the estimated processing performance capabilities including at least of cutting time, cutting speed, cutting cost, or overall life of consumable of the consumable component configuration; and
   presenting for selection by the user, via a display associated with the thermal processing system, the estimated processing performance capabilities for the two or more consumable component configurations; and
   selecting, by the user, one of the consumable component configurations for the processing operation.

2. The method of claim 1 further including estimating the processing performance capabilities, for each consumable component configuration, using two or more sets of system parameters associated with performing the proposed processing operation using that configuration.

3. The method of claim 2 wherein the sets of system parameters include at least one of ranges of speed, gas flow, or electrical current provided to the thermal processing system.

4. The method of claim 1 wherein the estimated processing performance capabilities include at least one of estimated quality of the proposed processing operation, estimated time needed to perform the proposed processing operation, estimated cost for performing the proposed processing operation, or estimated amount of time during which the consumable component configuration can be used for performing the proposed processing operation.

5. The method of claim 4 wherein the estimated cost for performing the proposed processing operation includes at least one of an estimated cost for amount of wear expected to be incurred by the consumable component configuration or an estimated cost for amount of time expected to be consumed for performing the proposed processing operation using the consumable component configuration.

6. The method of claim 1 further including presenting the estimated processing performance capabilities to the user on a diagram, the diagram providing the estimated processing performance capabilities associated with using each consumable component configuration.

7. The method of claim 1 further including presenting a visual representation of the estimated processing performance capabilities associated with using each consumable component configuration to the user.

8. The method of claim 1 further comprising, responsive to the selection of the user, performing the proposed processing operation using a consumable component configuration associated with the selected processing performance capabilities.

9. The method of claim 1 further including presenting, to the user, the estimated processing performance capabilities associated with using at least three consumable component configurations.

10. The method of claim 1 wherein at least one of the consumable component configurations corresponding to the estimated processing performance capabilities selected by the user includes at least one of an electrode, a nozzle, or a shield.

11. The method of claim 1 wherein the processing operation is a cutting operation.

12. A method for configuring a thermal processing system to perform a processing operation, the method comprising:
    determining two or more sets of system parameters associated with performing the processing operation using two or more consumable component configurations, the two or more sets of system parameters corresponding to different consumable resources suitable for performing the processing operation;
    for each consumable component configuration:
        estimating processing performance capabilities expected to be obtained from using the system parameters associated with the consumable component configuration, the estimated processing performance capabilities including at least one of cutting time, cutting speed, cutting cost, or overall life of consumables of the consumable component configuration; and
        presenting, via an interactive device associated with the thermal processing system, the estimated processing performance capabilities to a user for selection; and
    responsive to the user's selection, performing the processing operation using a consumable component configuration associated with the selected processing performance capabilities.

13. The method of claim 12 wherein the resources expected to be consumed for performing the processing operation include at least one of gas flow or electrical current provided to the thermal processing system.

14. The method of claim 12 wherein the estimated processing performance capabilities include at least one of estimated quality of the proposed processing operation, estimated time needed to perform the proposed processing operation, estimated cost for performing the proposed processing operation, or estimated amount of time during which the consumable component configuration can be used for performing the proposed processing operation.

15. The method of claim 14 wherein the estimated cost for performing the proposed processing operation includes at least one of an estimated cost for amount of wear expected to be incurred by the consumable component configuration or an estimated cost for amount of time expected to be consumed for performing the proposed processing operation using the consumable component configuration.

16. The method of claim 12 further including presenting, to the user, the estimated processing performance capabilities associated with using at least three consumable component configurations for performing the proposed processing operation.

17. The method of claim 12 wherein the processing operation is a cutting operation.

18. A thermal processing system for performing a processing operation, the thermal processing system comprising:
    a processor configured to:
        receive, from a user, information relating to a proposed processing operation to be performed by the thermal processing system;
        determine, responsive to the information received from the user, two or more consumable component configurations for performing the proposed processing operation; and
        estimate processing performance capabilities associated with using each consumable component configuration, the estimated processing performance capabilities including at least one of cutting time, cutting speed, cutting cost, or overall life of consumables of the consumable component configuration; and
    an interactive display configured to present the estimated processing performance capabilities to the user for selection.

19. The thermal processing system of claim 18 wherein the processor is configured to estimate the processing performance capabilities, for each consumable component configuration, using two or more sets of system parameters associated with performing the proposed processing operation using that configuration.

20. The thermal processing system of claim 18 wherein the sets of system parameters include at least one of ranges of speed, gas flow, or electrical current provided to the thermal processing system.

21. The thermal processing system of claim 18 wherein the estimated processing performance capabilities include at least one of estimated quality of the proposed processing operation, estimated time needed to perform the proposed processing operation, estimated cost for performing the proposed processing operation, or estimated amount of time during which the consumable component configuration can be used for performing the proposed processing operation.

22. The thermal processing system of claim 21 wherein the estimated cost for performing the proposed processing operation includes at least one of an estimated cost for amount of wear expected to be incurred by the consumable component configuration or an estimated cost for amount of time expected to be consumed for performing the proposed processing operation using the consumable component configuration.

23. The thermal processing system of claim 18 wherein the thermal processing system is configured to perform the proposed processing operation, responsive to the user's selection, using a consumable component configuration associated with the selected processing performance capabilities.

24. The thermal processing system of claim 18 wherein the processing operation is a cutting operation.

* * * * *